United States Patent
Courtois

(10) Patent No.: US 6,256,385 B1
(45) Date of Patent: *Jul. 3, 2001

(54) POWER SUPPLY ADAPTER CIRCUIT

(75) Inventor: Fernand Courtois, Caen (FR)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,432

(22) Filed: Aug. 26, 1998

(30) Foreign Application Priority Data

Aug. 27, 1997 (FR) .................................................. 97 10691

(51) Int. Cl.$^7$ .................................................. H04M 9/00
(52) U.S. Cl. ............................ 379/413; 307/98; 307/99; 323/223; 323/299
(58) Field of Search ................................ 307/98, 99, 103, 307/146, 148; 323/223, 282, 284, 299; 379/413

(56) References Cited

U.S. PATENT DOCUMENTS

| | | | |
|---|---|---|---|
| 4,315,207 | * 2/1982 | Apfel | 383/284 |
| 4,704,572 | * 11/1987 | Melbert | 323/275 |
| 4,712,169 | * 12/1987 | Albach | 363/89 |
| 4,728,807 | * 3/1988 | Harafuji et al. | 307/52 |
| 4,731,574 | * 3/1988 | Melbert | 323/275 |
| 5,075,637 | * 12/1991 | Jouen et al. | 330/279 |
| 5,113,434 | * 5/1992 | Fox | 379/413 |
| 5,302,889 | * 4/1994 | Marsh | 323/284 |
| 5,365,161 | * 11/1994 | Inoue et al. | 323/282 |
| 5,440,223 | * 8/1995 | Hayasaki | 323/282 |
| 5,477,185 | * 12/1995 | Jouen | 327/579 |
| 5,479,090 | * 12/1995 | Schultz | 323/284 |
| 5,742,676 | * 4/1998 | Courtois | 379/413 |
| 5,932,938 | * 8/1999 | Shimamori | 307/125 |

OTHER PUBLICATIONS

Martins et al. "CMOS shunt regulator with bandgap reference for automotive environment" Jun. 1994, 157–161, IEE Proc.–Circuits Devices Syst, VBol 141, No. 3.*

Bigelow et al. "Understanding telephone electronics", 1997, p. 137.*

* cited by examiner

Primary Examiner—William R. Korzuch
Assistant Examiner—Susan Wieland
(74) Attorney, Agent, or Firm—Jack D. Slobod

(57) ABSTRACT

An adapter circuit PSA includes a comparator module OA, and a regulation module RM for normally adjusting the value of an output voltage Vout intended to be applied to an external circuit to a predetermined nominal regulation value Vreg0. In response to a measuring module SC sensing a reverse current flow at the output which is produced when an external power supply source in the external circuit connected to the output of the adapter circuit PSA includes an effective voltage source Vext which imposes on the output a voltage VDD which has a higher value than the nominal regulation value Vreg0, feedback coupled to an input to the comparator module OA is activated to raise the value to which the output voltage VDD is regulated to equality with the value of the effective voltage source Vext, thereby nulling the output current.

6 Claims, 2 Drawing Sheets

POWER SUPPLY ADAPTER CIRCUIT

FIELD OF THE INVENTION

The present invention relates to a power supply adapter circuit intended to be connected between a power supply terminal called line terminal and reference potential terminal, the circuit having an output terminal intended to supply an output voltage to a load connected between the output terminal and the reference potential terminal, which output voltage has a value called regulation value, the circuit comprising:

- a comparator module having a first and a second input respectively intended to receive a voltage that represents the output voltage and a voltage that has a predetermined value, and an output intended to deliver a signal which represents the result of the comparison between said voltages, and
- a regulation module having an input connected to the output of the comparator module, and intended to adjust the value of the output voltage to a predetermined nominal regulation value.

BACKGROUND OF THE INVENTION

A circuit of this type is often used for generating a regulated voltage for feeding other electronic components, which then form the load of the adapter circuit, inside a telephony device. The power used for generating the regulated voltage comes in this case from a telephone line to which the device is connected. The actual telephony device is often associated with an extra device called peripheral such as, for example, a telephone answering machine or a facsimile machine. Such a peripheral receives, in principle, the power it needs from a power grid and may thus form for the telephony device a better performing power supply source than the telephone line. It is thus desirable to provide the possibility of connecting the external power supply source formed by the peripheral to the load fed by the power supply adapter circuit. If the external power supply source delivers an output voltage having a higher value than the regulation value of the regulation module, the latter will attempt to lower this value without, however, managing it, since it is then the external power supply source that imposes the potential of the output terminal of the circuit. These attempts will, at best, cause a considerable waste of power, and, in the worst case, a breakdown of the external power supply source because of the very large consumption of power which the regulation module will spend on these vain correcting efforts.

It is an object of the present invention to remedy these drawbacks by proposing a power supply adapter circuit whose regulation module is inhibited when the output of the circuit is connected to an external power supply source which imposes on said output a voltage whose value is higher than the nominal regulation value.

SUMMARY OF THE INVENTION

Indeed, a power supply adapter circuit as defined in the opening paragraph is characterized, according to the invention, in that it comprises means for adjusting the regulation value to the value of a voltage delivered to the adapter circuit by an outside voltage source when said voltage source is connected to the load.

In such an adapter circuit, everything takes place as if the value of the voltage delivered by the outside voltage source became the nominal regulation value. The regulation module will thus no longer attempt to modify the value of the output voltage, but, in contrast, will tend to maintain the output voltage at this new nominal regulation value, thus giving greater stability to the association of the adapter circuit with the outside voltage source.

In one of its possible embodiments, an adapter circuit according to the invention is characterized in that the regulation module comprises a capacitor connected between the line terminal and the reference potential terminal, and a transistor having a bias terminal connected to the output of the comparator module, a reference terminal and a transfer terminal, the main current path of which transistor, defined as being the junction between the transfer terminal and the reference terminal, is connected in parallel to said capacitor.

This embodiment of the regulation module, which is advantageous in its simplicity, enables a stabilization of the output voltage thanks to the storage capability of the capacitor. When the value of the output voltage, that is to say, the voltage present on the terminals of the capacitor, exceeds the nominal regulation value, this transgression is detected by the comparator module whose output controls the turning on of the transistor of the regulation module. This causes a partial discharging of the capacitor to occur through the main current path of the transistor. When the value of the output voltage drops below the nominal regulation value, the output of the comparator module switches again and interrupts the conduction of the transistor. The capacitor may thus again charge itself, because it is connected to the line terminal, until the next transgression which will cause the cycle described above to be reproduced.

In a particular embodiment of the invention, a power supply adapter circuit is characterized in that it additionally includes a measuring module intended to deliver on an output a signal that represents the value of a current, called output current, which passes through the output terminal of the circuit, and a voltage divider bridge formed by at least a first and a second resistor connected in series between the line terminal and the reference potential terminal, and featuring between them an intermediate node connected to the first input of the comparator module, and in that the regulation module includes injection means, activated by the output of the measuring module when the output current flows from the outside to the inside of the circuit, for injecting a current in that of the divider bridge's resistors which separates the line terminal from the first input of the comparator module.

In such an adapter circuit, the measuring module detects the presence of an outside voltage source connected to the load and supplying a voltage that has a value that is higher than the nominal regulation value, when the output current flows from the outside to the inside of the circuit. The injection means are then put into action. These injection means will perform a correction of the nominal regulation value. The injection of the current into that of the divider bridge's resistors which separates the line terminal from the first input of the comparator module, the first resistor as it is, results in an increase of the value of the voltage drop on the terminals of said first resistor and thus in a drop of the value of the voltage received by the comparator module on its first input. Accordingly, a higher output voltage is necessary for making the output of the comparator module switch and activating the regulation means. The structure described above automatically ensures that the value of the total voltage drop on the terminals of the first resistor is such that the sum of this value and of the predetermined voltage is equal to the value of the voltage delivered by the outside voltage source, which would be equivalent to a configuration where the nominal regulation value becomes equal to the value of the voltage delivered by the outside voltage source. Indeed, as long as the correction made by way of the injection means is not large enough, the output current continues to flow from the outside to the inside of the adapter circuit. The injection means thus receive from the measuring module a signal that tells them to carry out a more significant current injection and thus a correction that is larger until a state of balance is reached, that is to say, until the new nominal regulation value and the value of the voltage delivered by the outside voltage source are equal, which balance is translated in theory by a reduction to zero of the value of the output current. In practice, one will rather see an overshoot, that is to say, a change of direction of the output current due to a correction of too large a magnitude, following which overshoot the value of the injected current will diminish until the output current changes direction again, and so on and so forth.

In a particularly advantageous embodiment of the invention, a power supply adapter circuit as described above is characterized in that the injection means comprise a transistor whose bias input is connected to the output of the measuring module and whose main current path is connected between the first input of the comparator module and the reference potential terminal.

In such an adapter circuit, the injection means adopt a form that is particularly easy to implement because they consist of a single transistor. This transistor receives on its bias input a signal delivered by the measuring module, which signal is representative of the value of the output current. The value of the current that passes through the main current path of the transistor, which forms the injected current and thus represents the magnitude of the correction made, is proportional to the value of the output signal of the measuring circuit and thus to the magnitude of the sought correction.

As explained earlier, a power supply adapter circuit according to the invention will advantageously be used in a telephony device. The invention thus also relates to a telephony device comprising:

- a rectifier bridge having two terminals, called AC terminals, intended to be connected to a telephone line, a first and a second terminal, called DC terminals, respectively, intended to deliver and receive a rectified current called line current,
- an interface module connected between the DC terminals and notably intended to perform a processing of data transported by the line current, and
- a microcontroller intended to receive and manage instructions given by a user of the device, which microcontroller has a positive supply terminal and a reference potential terminal which is connected to one of the DC terminals of the rectifier bridge, characterized in that it additionally includes:

- a power supply adapter circuit as described above, connected between the DC terminals of the rectifier bridge, and whose output terminal is connected to the positive supply terminal of the microcontroller.

Thanks to the invention, such a telephony device may, when associated with a peripheral, use a supply voltage produced by the latter for supplying power to certain of its internal electronic components such as, for example, the microcontroller.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
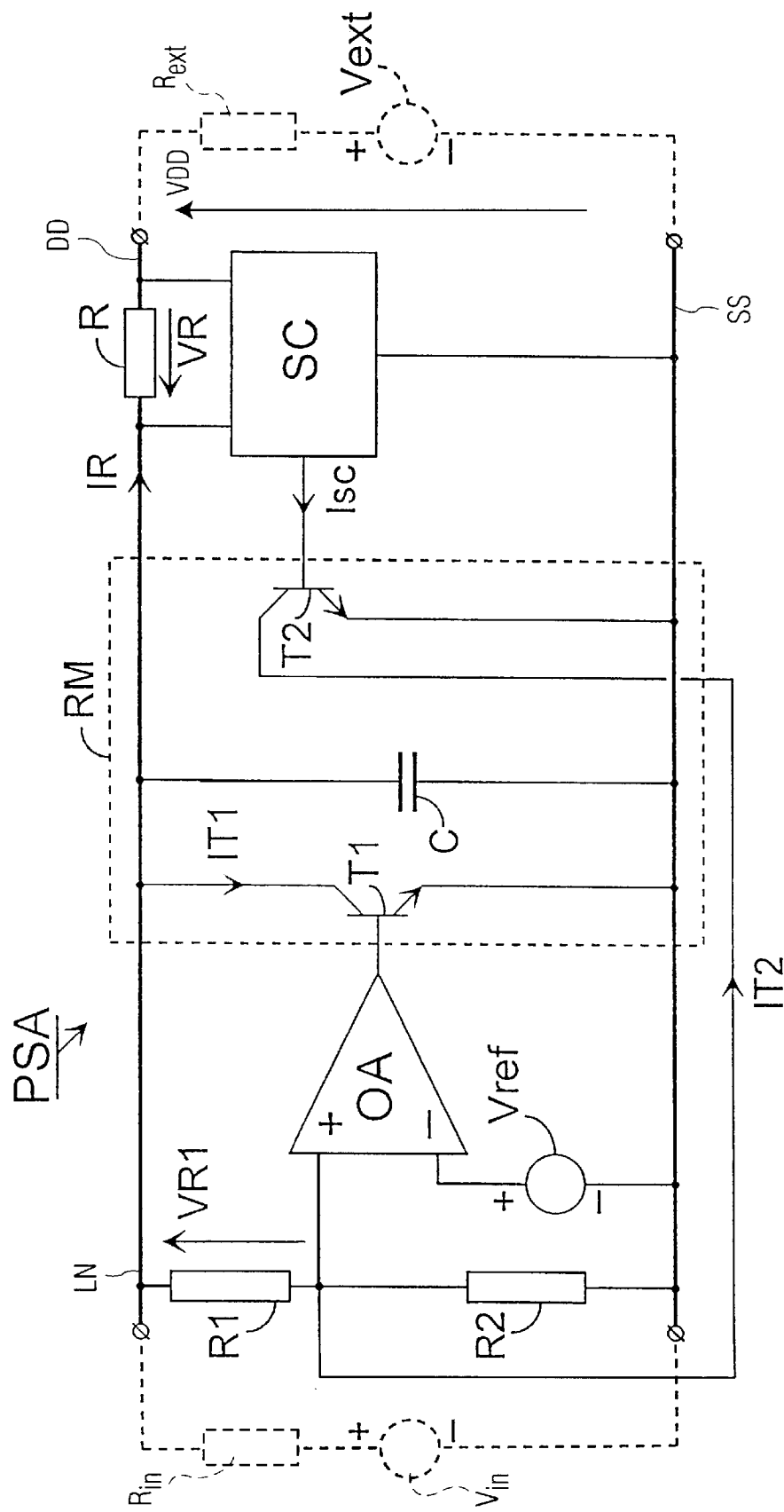
FIG. 1 shows an electric diagram of a power supply adapter circuit according to the invention.

FIG. 1 partly describes a power supply adapter circuit PSA according to the invention. This adapter circuit PSA is intended to be connected between a line terminal LN and a reference terminal SS of a power supply of a power supply source herein represented in dashed line by the series combination of a DC voltage source Vln and a resistor Rln. The adapter circuit has an output voltage VDD intended to apply across a load, when the load is connected between an output terminal DD and the reference potential terminal SS. The adapter circuit PSA regulates the voltage VDD to a value called regulation value. The circuit comprises:

- a comparator module OA formed here by an operational amplifier having a first and second input, respectively intended to receive a voltage that represents the output voltage VDD and a voltage Vref that has a predetermined value, and an output intended to deliver a signal which represents the result of the comparison between said voltages, and
- a regulation module RM having an input connected to the output of the comparator module OA and intended to adjust the value of the output voltage VDD to a predetermined nominal regulation value Vreg0.

The regulation module RM comprises a capacitor C connected between the line terminal LN and the reference potential terminal SS VSS, and a transistor T1. This transistor T1 is of the bipolar NPN type in this example, and has a collector that forms a transfer terminal, an emitter that forms a reference terminal and a base that forms a bias terminal, which base is connected to the output of the comparator module OA. The main current path of this transistor T1, defined as being the junction between its collector and its emitter, is connected in parallel to the capacitor C. The power supply adapter circuit PSA further includes a measuring module (R, SC) intended to deliver on an output a signal that represents the value of a current called output current IR which passes through the output terminal DD of the adapter circuit PSA, and a voltage divider bridge formed by a first and a second resistor R1 and R2, connected in series between the line terminal LN and the reference potential terminal SS, thus featuring between them an intermediate node connected to the first input of the comparator module OA. The regulation module RM has injection means, activated by the output of the measuring module (R, SC) when the output current IR flows from the outside to the inside of the adapter circuit PSA, that is to say, in a negative or reverse direction, opposite to that represented in the Figure, for injecting a current IT2 into the first resistor R1. These injection means are formed by a transistor T2 also of the bipolar NPN type in this example, whose base or control is connected to the output of the measuring module (R, SC) and whose main current path is connected between the first input of the comparator module OA and the reference potential terminal SS.

The operation of this power supply adapter circuit PSA is the following: in the absence of any outside voltage source, a stabilization of the output voltage VDD is formed thanks to the storage capacity of the capacitor C. When the value of the output voltage VDD, that is to say, the voltage present on between the terminals of the capacitor C, neglecting any possible voltage drop on the terminals of the measuring module (R, SC), exceeds the nominal regulation value Vreg0 equal to (R1+R2).Vref/R2, this transgression is detected by the comparator module OA whose output controls the turning on of the transistor T1 of the regulation module RM. This causes a partial discharging of the capacitor C through the main current path of the transistor T1, which results in a collector emitter current IT1. When the value of the output voltage VDD drops below the nominal regulation value Vreg0, the output of the comparator module OA switches again and interrupts the conduction of the transistor TI. The capacitor C may thus charge itself, since it is connected to the line terminal LN, until the next transgression which will call forth the reproduction of the cycle described above.

When an external circuit connected between output terminal DD and reference potential terminal, represented in dashed line by the series combination of an effective voltage source Vext and an effective resistance Rext, is such that the effective voltage source Vext has a value which is higher than the nominal regulation value Vreg0, the output current IR becomes negative, i.e. flows in a reverse direction. This change of direction is detected by the measuring module (R, SC) which comprises a resister R whose function is to generate a voltage VR that is negligible compared to Vreg0 and proportional to the output current IR, and a circuit SC for measuring and analyzing the evolution with time of said voltage VR. The injection means, formed here by the transistor T2, are then activated. The transistor T2 will perform a correction of the nominal regulation value Vreg0. The injection of a current IT2 into the first resistor R1 results in an increase of the value of the voltage drop VR1 on the terminals of said first resistor R1, and thus in a reduction of the value of the voltage received by the comparator module OA on its first input. Thus, a higher output voltage VDD will be needed to make the output of the comparator module switch and activate the regulation module RM. This structure automatically ensures that the value of the total voltage drop VR1 on the terminals of the first resistor R1 is such that Vref+VR1=Vext, the voltage drop VR between the terminals of the measuring module (R, SC) and the voltage drop across the effective resistance Rext being neglected, which would be equivalent to a configuration where the nominal regulation value is equal to the value of the voltage Vext delivered by the outside voltage source. Indeed, as long as the correction made by the additional voltage drop R1.IT2 caused by the transistor T2 is not large enough, the output current IR remains negative. The base of the transistor T2 thus receives from the measuring module (R, SC) a higher current Isc which then controls the conduction of a higher collector emitter current IT2 and thus a correction that is larger until a state of balance is reached, that is to say, until the equality between the new regulation value and the value of the effective voltage source Vext is reached, which is translated in theory by a reduction to zero of the value of the output current (IR=0). In practice, one will rather see an overshoot, that is to say, the output current IR will become positive because of too large a correction, after which overshoot the value of the injected current IT2 will diminish until the output current IR again changes direction, and so on and so forth. It should be noted that if the value of the effective voltage source Vext is lower than the nominal regulation value Vreg0, the output current IR remains positive and the injection means are not activated. It is thus systematically the one of the available voltages Vreg0 or Vext that has the larger value which forms the output voltage VDD. The power supply adapter circuit PSA thus makes optimum use of available power resources.

Figure 2:
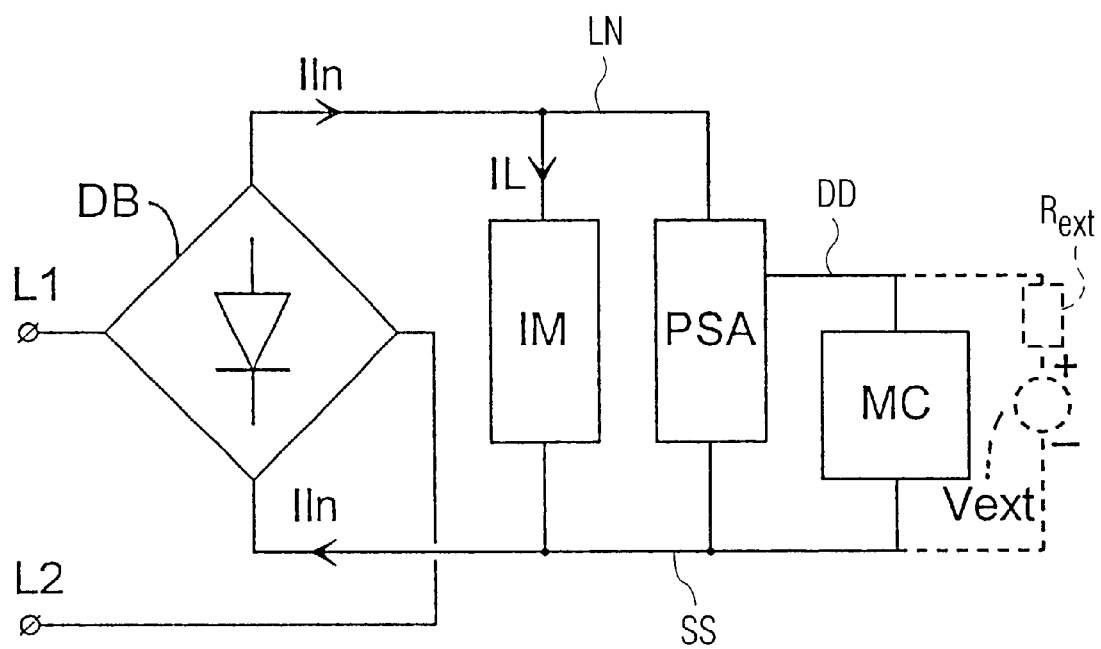
FIG. 2 shows an operational diagram of a circuit of a telephony device using an adapter circuit according to the invention.

FIG. 2 diagrammatically shows a telephony device comprising:
  a rectifier bridge DB having two terminals L1 and L2, which are called AC terminals and are intended to be connected to a telephone line, a first and a second terminal, called DC terminals, respectively intended to deliver and receive a rectified current Iln called line current,
  an interface module IM connected between the DC terminals and notably intended to process data transported by the line current, and
  a microcontroller MC, intended to receive and manage instructions given by a user of the device, having a positive supply terminal DD, and a reference potential terminal SS VSS which is connected to one of the DC terminals of the rectifier bridge DB.

This telephony device further includes a power supply adapter circuit PSA as described previously, connected between the DC terminals LN, SS of the rectifier bridge DB and of which the output terminal DD is connected to the positive supply terminal of the microcontroller MC.

Thanks to the power supply adapter circuit PSA, such a telephony device may use, when connected to a peripheral, a supply voltage Vext produced by the latter for supplying power to certain of its internal electronic components such as, for example, the microcontroller MC.

What is claimed is:
1. A power supply adapter circuit having a line terminal and a reference terminal for receiving therebetween a supply voltage from a power supply source having a series is output resistance, and an output terminal for supplying an output voltage to any external circuit connected between the output terminal and the reference terminal, the adapter circuit comprising:
  a comparator module having a first input for receiving a voltage that represents the supply voltage received from the power supply source after any voltage drop across said series output resistance, a second input for receiving a reference voltage that represents a predetermined nominal regulation value, and an output for delivering a signal which represents the result of the comparison between the voltages received at said first and second inputs,
  a regulation module for adjusting the value of the output voltage of the power supply adapter circuit to a regulation value which is normally equal to the predetermined nominal regulation value, said regulation module having an input coupled to the output of the comparator module, and
  means for adjusting the regulation value to the value of a voltage delivered to the adapter circuit by a voltage source included in an external circuit connected between the output terminal and the reference terminal, when the value of the voltage delivered to the adapter by the voltage source is greater than the predetermined nominal regulation value.

2. A power supply adapter circuit as claimed in claim 1, wherein the regulation module comprises a capacitor connected between the line terminal and the reference terminal, and a transistor having a control terminal connected to the output of the comparator module and a main current path connected in parallel with the capacitor.

3. A power supply adapter circuit as claimed in claim 1, further comprising a measuring module intended to deliver on an output a signal that represents the value of an output current which passes through the output terminal of the circuit, and a voltage divider having an input connected between the line terminal and the reference terminal, and an output which is connected to the first input of the comparator module, and wherein said inhibiting means comprises signal injection means coupled to the first input of the comparator module which signal injection means is activated by the output of the measuring module when the output current flows in a reverse direction, indicative that any said external device includes a voltage source which imposes between the output terminal and the reference terminal a voltage having a value which exceeds said predetermined nominal regulation value, for injecting a current flowing in that portion of the divider which is between the line terminal and the first input of the comparator module.

4. A power supply adapter circuit as claimed in claim 3, wherein the injection means comprises a transistor whose control input is connected to the output of the measuring module and whose main current path is connected between the first input of the comparator module and the reference terminal.

5. A telephony device comprising:
- a rectifier bridge having two AC terminals intended to be connected to a telephone line, first and second DC terminals intended to deliver and receive rectified line current, as viewed from said DC terminals said rectifier bridge constituting a DC power supply source in series with an output resistance,
- an interface module connected between the DC terminals and intended to perform a processing of data transported by the line current, and a microcontroller intended to receive and manage instructions given by a user of the device, which microcontroller has a power supply input terminal, and a reference terminal which is connected to one of the DC terminals of the rectifier bridge, and
- a power supply adapter circuit having input terminals connected between the DC terminals of the rectifier bridge and an output terminal connected to the power supply input terminal of the microcontroller, wherein said power supply adapter circuit comprises:
- a comparator module having a first input for receiving a voltage that represents a supply voltage received between the DC terminals of the rectifier bridge which is the voltage of said DC power supply source after any voltage drop across said series output resistance, a second input for receiving a reference voltage that represents a predetermined nominal regulation value, and an output for delivering a signal which represents the result of the comparison between the voltages received at said first and second inputs,
- a regulation module for adjusting the value of the output voltage of the power supply adapter circuit to a regulation value which is normally equal to the predetermined nominal regulation value, said regulation module having an input coupled to the output of the comparator module, and
- means for adjusting the regulation value to the value of a voltage delivered to the adapter circuit by a voltage source included in an external circuit connected between the output terminal and the reference terminal, when the value of the voltage delivered to the adapter by the voltage source is greater than the predetermined nominal regulation value.

6. A power supply adapter circuit having a line terminal and a reference terminal for receiving therebetween a supply voltage from a power supply source via a series output resistance of said power supply source, and an output terminal for supplying an output voltage to any external circuit connected between the output terminal and the reference terminal, the adapter circuit comprising:
- a capacitor substantially supplying said output voltage,
- a transistor having a control terminal, and having a main current path coupled in parallel with said capacitor,
- means for adjusting the value of the output voltage of the power supply adapter circuit to a regulation value which is the greater of a predetermined nominal regulation value and a value imposed on the output voltage by a voltage source included in an external circuit connected between the output terminal and the reference terminal.

* * * * *